US011026502B1

(12) United States Patent
    Erold

(10) Patent No.: US 11,026,502 B1
(45) Date of Patent: Jun. 8, 2021

(54) PORTABLE ELECTRONIC DEVICE LEASH AND ASSOCIATED USE THEREOF

(71) Applicant: Francisco Erold, Jamaica Plain, MA (US)

(72) Inventor: Francisco Erold, Jamaica Plain, MA (US)

( * ) Notice: Subject to any disclaimer, the term of this patent is extended or adjusted under 35 U.S.C. 154(b) by 0 days.

(21) Appl. No.: 16/438,380

(22) Filed: Jun. 11, 2019

Related U.S. Application Data

(60) Provisional application No. 62/683,119, filed on Jun. 11, 2018.

(51) Int. Cl.
    *A45F 5/00* (2006.01)
    *A45F 5/02* (2006.01)
    *G08B 21/18* (2006.01)
    *H04B 1/3888* (2015.01)

(52) U.S. Cl.
    CPC ............... *A45F 5/004* (2013.01); *A45F 5/02* (2013.01); *G08B 21/18* (2013.01); *H04B 1/3888* (2013.01); *A45F 2200/0516* (2013.01)

(58) Field of Classification Search
    CPC ............ A45F 5/004; A45F 2200/0516; B65H 75/4484; G08B 21/18; H04B 1/3888
    USPC ............. 224/912, 305, 162; 116/67 A, 67 R; 242/912, 305, 162
    See application file for complete search history.

(56) References Cited

U.S. PATENT DOCUMENTS

| 5,918,658 | A * | 7/1999 | Schartner | E06B 9/30 160/173 R |
| 6,082,017 | A * | 7/2000 | Simar | G01B 3/1056 33/755 |
| 6,253,461 | B1 * | 7/2001 | Fischer | A01K 91/20 242/223 |
| 6,578,797 | B2 * | 6/2003 | Fischer | A63H 27/002 244/155 A |
| 7,077,350 | B2 * | 7/2006 | Koelewyn | A01K 89/0162 242/295 |
| 7,151,912 | B1 * | 12/2006 | Morrison | H04M 1/15 455/90.3 |
| 7,156,338 | B2 * | 1/2007 | Schartner | E06B 9/326 160/178.1 R |
| 7,216,665 | B1 * | 5/2007 | Sims, Jr. | A61M 39/08 137/355.19 |
| 8,112,132 | B2 * | 2/2012 | Chan | B65H 75/4431 455/575.2 |

(Continued)

*Primary Examiner* — Adam J Waggenspack
(74) *Attorney, Agent, or Firm* — Ashkan Najafi

(57) ABSTRACT

A combined portable electronic leash and mobile phone case includes a mobile phone case, and a portable leash. The leash includes a housing including a centrally registered rotational axis, a spool having a plurality of stationary spokes fixedly attached thereto, a primary spring member anchored to the spokes and wound along a circumferential inner surface of the spool, a central bracket and a secondary spring located therein, a flexible cable having a proximal end anchored to the bracket and wrapped about a circumferential outer surface of the spool, a fastener attached to a distal end of the flexible cable and detachably connected to the mobile phone case, and a mechanism for transmitting an alert signal when the flexible cable is extracted beyond a maximum threshold distance outwardly away from the housing. The alert signal transmitting mechanism is coupled to the housing and the flexible cable.

13 Claims, 6 Drawing Sheets

(56) References Cited

U.S. PATENT DOCUMENTS

| | | | | |
|---|---|---|---|---|
| 8,220,676 | B1* | 7/2012 | Hicks | B65H 75/48 |
| | | | | 224/162 |
| 9,476,253 | B2* | 10/2016 | Lai | E06B 9/326 |
| 10,519,013 | B2* | 12/2019 | Curran | B66D 1/741 |
| 2004/0089759 | A1* | 5/2004 | Genuise | A45F 5/004 |
| | | | | 242/379 |
| 2005/0072819 | A1* | 4/2005 | Maldonado | A45F 5/021 |
| | | | | 224/162 |
| 2010/0243783 | A1* | 9/2010 | Hermann, II | A62B 99/00 |
| | | | | 242/377 |
| 2017/0352249 | A1* | 12/2017 | Clip | A45C 13/18 |

* cited by examiner

PORTABLE ELECTRONIC DEVICE LEASH AND ASSOCIATED USE THEREOF

CROSS REFERENCE TO RELATED APPLICATIONS

This is a non-provisional patent application that claims the benefit of U.S. provisional patent application No. 62/683,119 filed Jun. 11, 2018, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to electronic device leashes and, more particularly, to a portable electronic device leash including a retractable, tethered mobile device leash system that is either attached to the back of a cell phone via suction cup, or to a specially designed, accompanying cell phone case, and affixed to the person with optimal security and accessibility, via a security clip thereby efficiently securing and operating the portable electronic device (e.g., phone), and "catch" the phone and prevent damage should the phone be accidentally dropped. Optionally, the portable electronic device may include a GPS tracking chip linked to a dedicated app to locate the phone, should it become lost or stolen.

Prior Art

The market is currently flooded with cell phone accessories that seek to make use of these handy units even more convenient. Compact headsets, featuring a speaker that can be affixed to the ear in addition to an integrally attached mouthpiece, are designed for consumers with busy schedules. Freeing the hands from holding the unit, headsets allow cell phone users to conduct business or personal conversations while attending to other tasks. Additionally, belt clips for encasing devices are very practical, providing a housing for the unit when it is not in use and a sturdy means of storage when the phone is used in conjunction with the headset.

However, while these accessories add convenience, there are times when the cell phone is unplugged from the headset and/or removed from a clip. And in today's busy and hectic world, it is common for a cell phone user to set the unit down . . . and forget where they put it. Unfortunately, this inadvertent misplacement can have negative consequences. For instance, the cell phone is the sole means of telecommunications for some, and an elusive phone can result in one missing very important calls.

In addition, cell phones typically contain a user's full list of contact numbers, without which they have no means of retrieving a needed phone number. Cellular smartphones are quite expensive, and losing one can result in very costly replacement.

Additionally, management problems are exacerbated with the increasingly popular slimline smartphones, since these are not kept in a belt clip. With slippery plastic casing and glass fronts, it is not uncommon for these units to easily slip from one's grasp. Should the glass protecting the screen crack or break, it can cost almost as much as a new phone to have it replaced. Considering that cellular and smartphones are becoming more and more necessary, convenient and reliable means of managing and maintaining these units have become especially important.

Accordingly, a need remains for a portable electronic device leash in order to overcome at least one of the above-noted shortcomings. The exemplary embodiment(s) satisfy such a need by a retractable, tethered mobile device leash system that is either attached to the back of a cell phone via suction cup, or to a specially designed, accompanying cell phone case, and affixed to the person with optimal security and accessibility, via a security clip that is convenient and easy to use, lightweight yet durable in design, versatile in its applications, and designed for efficiently securing and operating the portable electronic device (e.g., phone), and "catch" the phone and prevent damage should the phone be accidentally dropped. Optionally, the portable electronic device may include a GPS tracking chip linked to a dedicated app to locate the phone, should it become lost or stolen.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a portable electronic device leash including a retractable, tethered mobile device leash system that is either attached to the back of a cell phone via suction cup, or to a specially designed, accompanying cell phone case, and affixed to the person with optimal security and accessibility, via a security clip thereby efficiently securing and operating the portable electronic device (e.g., phone), and "catch" the phone and prevent damage should the phone be accidentally dropped. Optionally, the portable electronic device may include a GPS tracking chip linked to a dedicated app to locate the phone, should it become lost or stolen.

These and other objects, features, and advantages of the non-limiting exemplary embodiment(s) are provided by a combined portable electronic leash and mobile phone case for preventing damage to an existing mobile phone if accidentally dropped. Such a combined portable electronic leash and mobile phone case includes a mobile phone case configured to be attached to an existing mobile phone, and a portable leash configured to be clipped to a user garment and detachably connected to the mobile phone case. Advantageously, the leash includes a housing including a centrally registered rotational axis, a spool having a plurality of stationary spokes fixedly attached thereto, a primary spring member anchored to the spokes and wound along a circumferential inner surface of the spool, a central bracket and a secondary spring located therein, a flexible cable having a proximal end anchored to the bracket and wrapped about a circumferential outer surface of the spool, a fastener attached to a distal end of the flexible cable and detachably connected to the mobile phone case, and a mechanism for transmitting an alert signal when the flexible cable is extracted beyond a maximum threshold distance outwardly away from the housing. Advantageously, the alert signal transmitting mechanism is coupled to the housing and the flexible cable. Such a structural configuration provides the new, useful, and unpredicted result of facilitating efficient operation of the mobile phone, as well as "catching" the phone and preventing damage should the phone be accidentally dropped.

In a non-limiting exemplary embodiment, the alert signal transmitting mechanism includes a controller, a transducer communicatively coupled to the controller a stationary sensor statically affixed to an interior surface of the housing, and a plurality of dynamic sensors statically affixed to a longitudinal length of the flexible cable. Advantageously, the stationary sensor generates and transmits an initiate alert signal to the controller when the flexible cable is extracted beyond the maximum threshold distance. Advantageously, the stationary sensor generates and transmits a terminate alert signal to the controller when the flexible cable is retracted within the maximum threshold distance (e.g., wound back into the housing). Advantageously, the controller, upon receipt of the initiate alert signal and the terminate alert signal, respectively instructs the transducer to initiate and terminate emission of an alarm signal. Such a structural configuration provides the new, useful, and unpredicted result of alerting a user when the phone is displaced beyond a maximum threshold distance from the leash housing.

In a non-limiting exemplary embodiment, the bracket includes a first slot and a second slot diametrically opposed therefrom such that the bracket is bifurcated into a first section and a second section spaced apart from the first section. In this manner, a shape of the first section is a mirror image of a shape of the second section. Advantageously, as perhaps best shown in FIGS. 4 and 5, an end of the primary spring member passes through one of the first slot and the second slot and statically engages one of the first section and the second section so that the primary spring member is tensioned and released as the spool is rotated in opposed rotational directions while the flexible cable is extracted and retracted relative to the housing, respectively. Such a structural configuration provides the new, useful, and unpredicted result of facilitating efficient operation of the mobile phone, as well as "catching" the phone and preventing damage should the phone be accidentally dropped.

In a non-limiting exemplary embodiment, the alert signal transmitting mechanism further includes a remotely located peripheral electronic device (e.g., laptop, tablet, PC, etc.), and a transceiver communicatively coupled to the controller for transmitting the alarm signal to the remotely located peripheral electronic device. Such a structural configuration provides the new, useful, and unpredicted result of alerting a user when the phone is displaced beyond a maximum threshold distance from the leash housing, as well as alerting the user of a location of the mobile phone via a graphical user interface, for example.

In a non-limiting exemplary embodiment, the housing further includes a first half section and a second half section removably coupled thereto, and a plurality of brakes disposed along and extended inwardly from the circumferential inner surface of the spool. Such a structural configuration provides the new, useful, and unpredicted result of facilitating efficient operation of the mobile phone, as well as "catching" the phone and preventing damage should the phone be accidentally dropped.

In a non-limiting exemplary embodiment, the first half section includes a central end cap including a finger directly abutted within the secondary spring member and aligned along the centrally registered rotational axis. Advantageously, the central end cap is displaced towards the central bracket and engaged with the brakes to oppose rotation of the spool. Such a structural configuration provides the new, useful, and unpredicted result of facilitating efficient operation of the mobile phone, as well as "catching" the phone and preventing damage should the phone be accidentally dropped.

In a non-limiting exemplary embodiment, the fastener is one of a carabiner and a suction cup. Such a structural configuration provides the new, useful, and unpredicted result of facilitating alternate connections to various types of mobile phone cases.

The present disclosure further includes a method of utilizing a combined portable electronic leash and mobile phone case for preventing damage to an existing mobile phone if accidentally dropped. Such a method includes the chronological steps of: providing an existing mobile phone; providing and attaching a mobile phone case to said existing mobile phone; and providing a leash. The leash includes a housing including a centrally registered rotational axis, a spool having a plurality of stationary spokes fixedly attached thereto, a primary spring member anchored to the spokes and wound along a circumferential inner surface of the spool, a central bracket and a secondary spring located therein, a flexible cable having a proximal end anchored to the bracket and wrapped about a circumferential outer surface of the spool, a fastener attached to a distal end of the flexible cable and detachably connected to the mobile phone case, and a mechanism for transmitting an alert signal when the flexible cable is extracted beyond a maximum threshold distance outwardly away from the housing.

The method further includes the chronological steps of: coupling the alert signal transmitting mechanism to the housing and the flexible cable; clipping the portable leash to the mobile phone case; detachably connecting the portable leash to a user garment; and transmitting an alert signal when the flexible cable is extracted beyond the maximum threshold distance outwardly away from the housing. Such a structural configuration provides the new, useful, and unpredicted result of facilitating efficient operation of the mobile phone, "catching" the phone and preventing damage should the phone be accidentally dropped, alerting a user when the phone is displaced beyond a maximum threshold distance from the leash housing, as well as alerting the user of a location of the mobile phone via a graphical user interface, for example.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
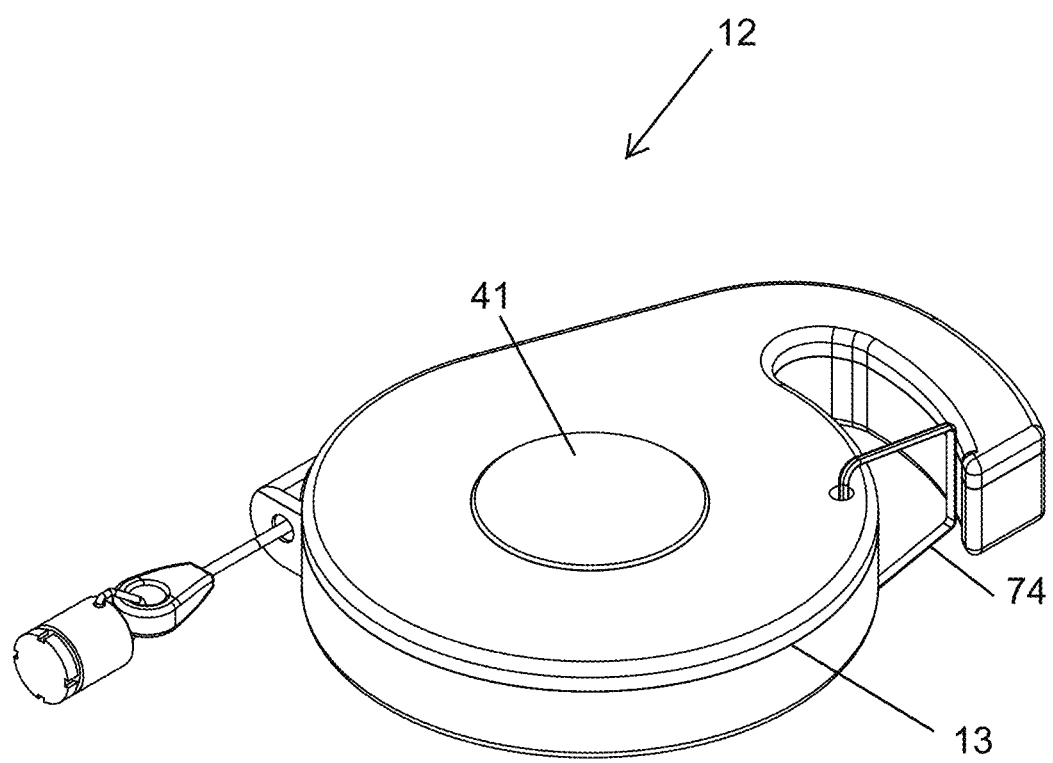
FIG. 1 is a portable electronic leash, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 2:
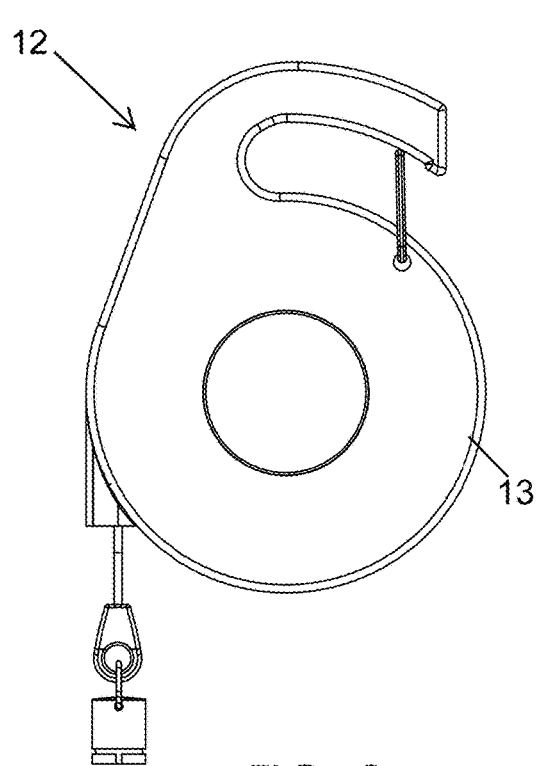
FIG. 2 is a top plan view of the portable electronic leash shown in FIG. 1.
Figure 3:
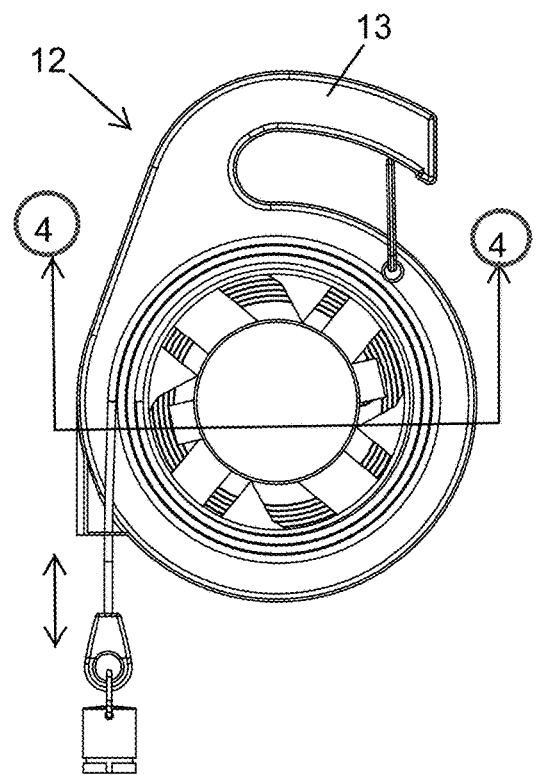
FIG. 3 is a top plan view of the portable electronic leash shown in FIG. 1, wherein a first half of the housing is removed from a second half of the housing.
Figure 4:
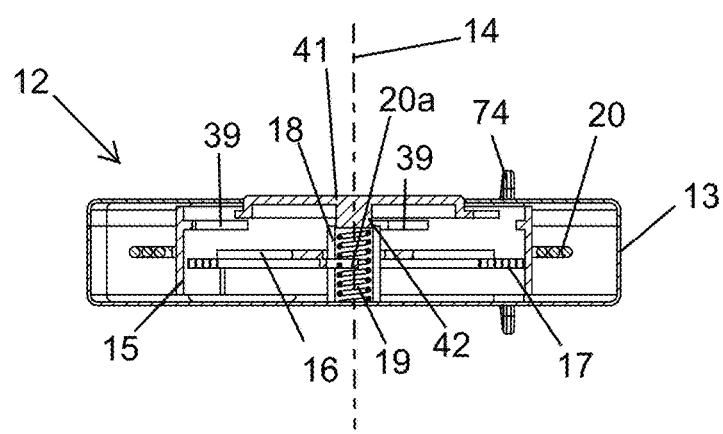
FIG. 4 is a cross-sectional view taken along line 4-4 in FIG. 3.
Figure 5:
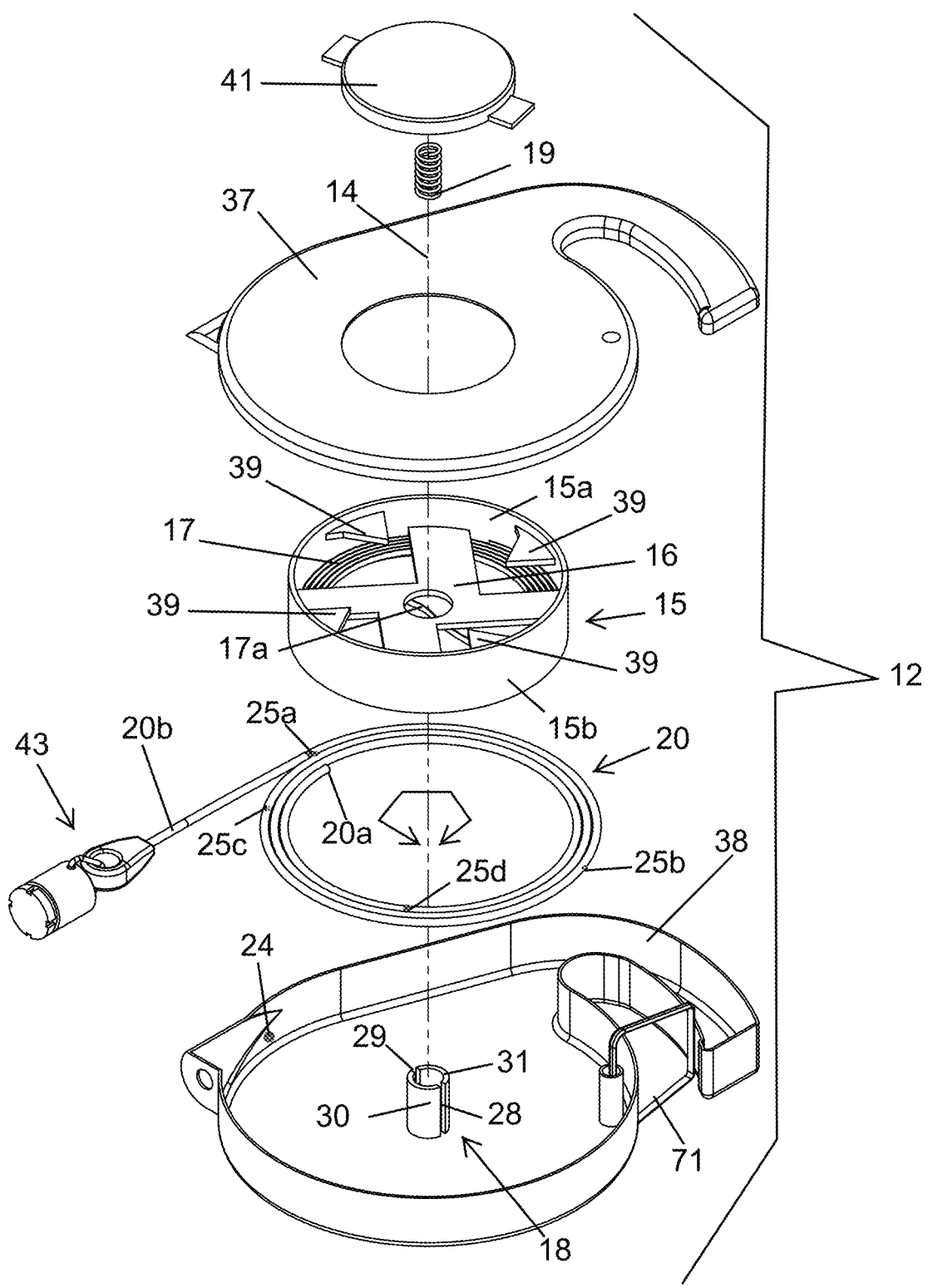
FIG. 5 is an exploded view of the portable electronic leash shown in FIG. 1.
Figure 6:
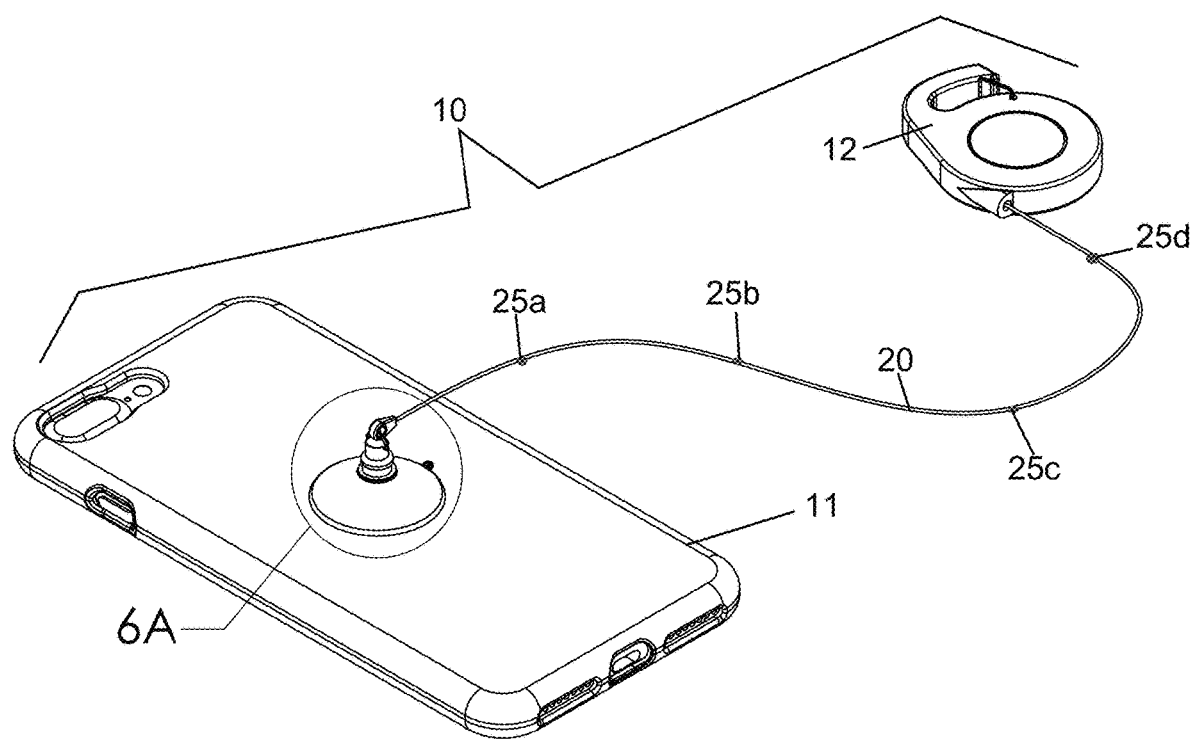
FIG. 6 is a perspective view of a combined portable electronic leash and mobile phone case, in accordance with a non-limiting exemplary embodiment of the present disclosure.
Figure 6A:
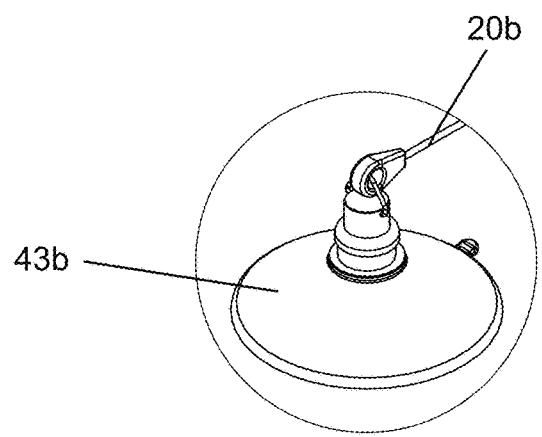
FIG. 6A is an enlarged view of section 6A taken in FIG. 6.
Figure 7:
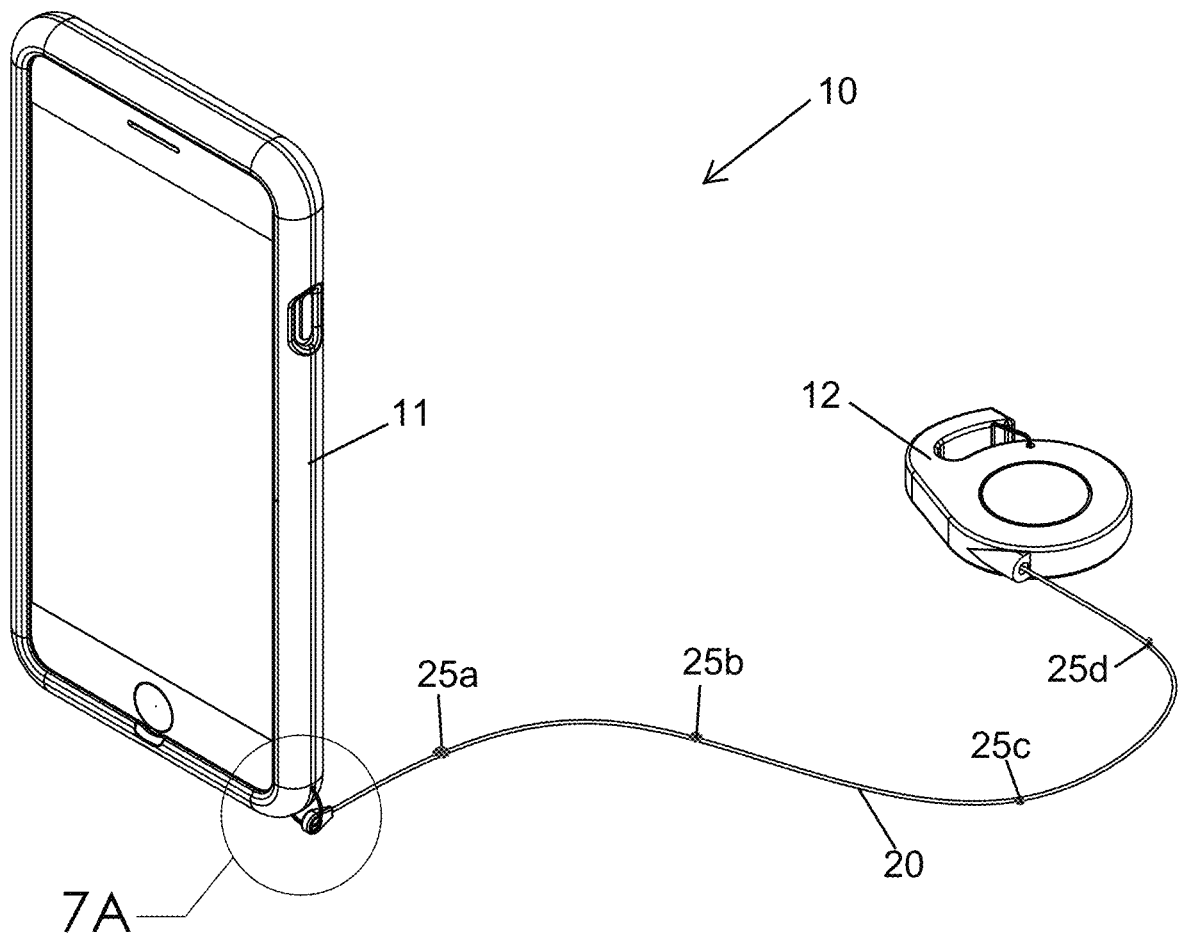
FIG. 7 is a perspective view of a combined portable electronic leash and mobile phone case, in accordance with another non-limiting exemplary embodiment of the present disclosure.
Figure 7A:
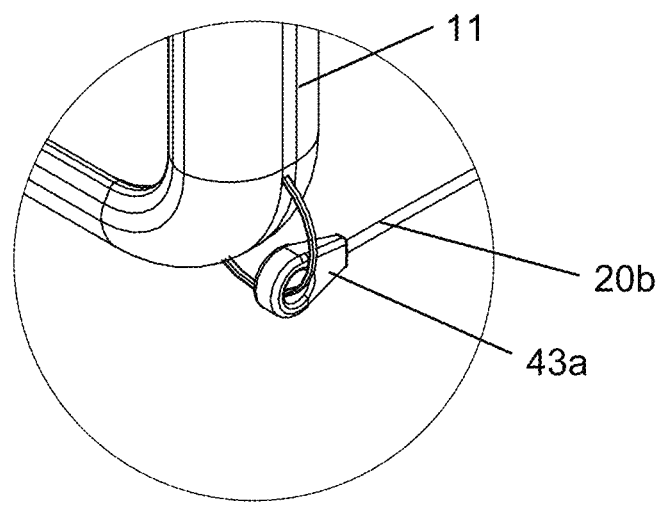
FIG. 7A is an enlarged view of section 7A taken in FIG. 7.
Figure 8:
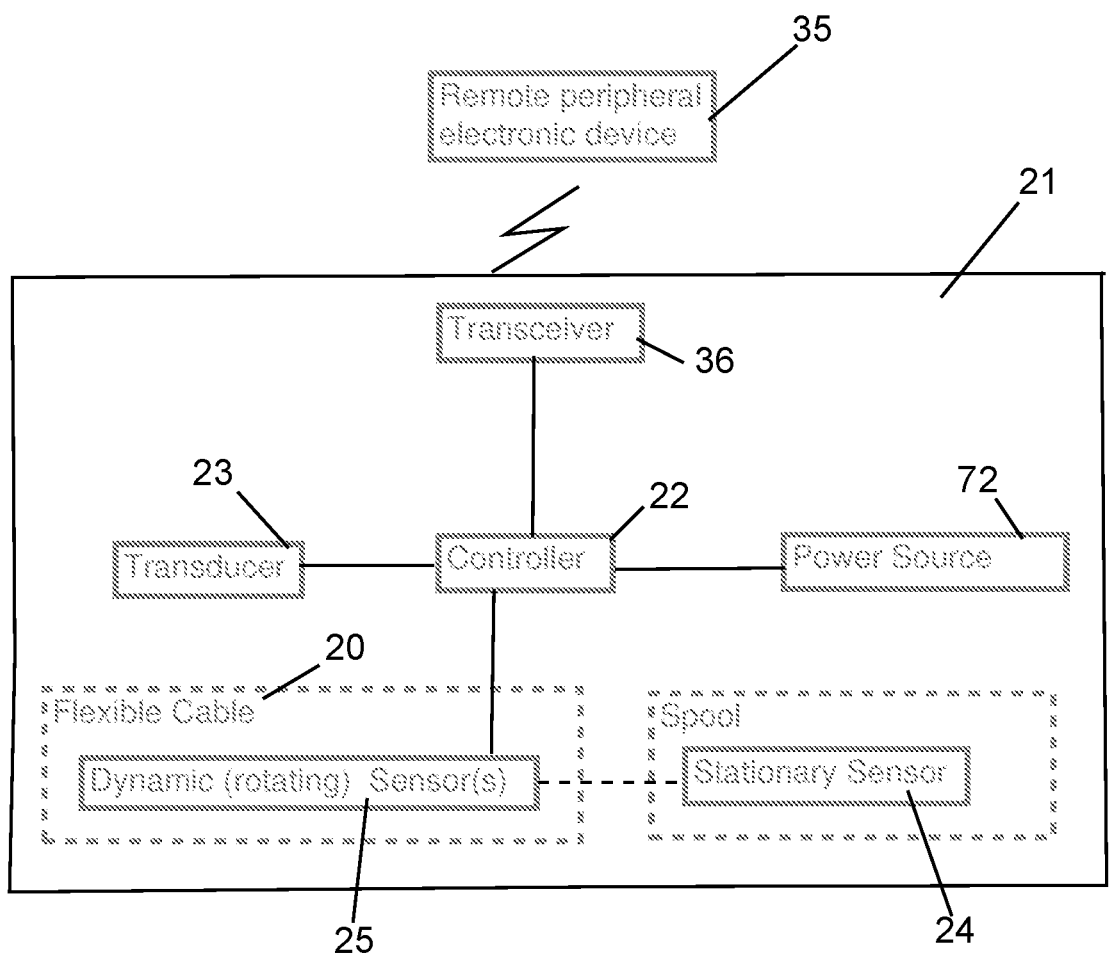
FIG. 8 is a high-level schematic block diagram illustrating the interrelationship between major electronic components of a non-limiting exemplary embodiment of the present disclosure.

The non-limiting exemplary embodiment(s) is/are referred to generally in FIGS. 1-8 and is/are intended to provide a combined portable electronic leash and mobile phone case (collectively at "10") including a retractable, tethered mobile leash 12 that is either attached to the back of the mobile phone case 11 via suction cup 43b, or to a specially designed, accompanying cell phone case 11, and affixed to the person (via 74) with optimal security and accessibility, via a security clip (fastener) thereby efficiently securing and operating the mobile phone, and "catch" the phone and prevent damage should the phone be accidentally dropped. Optionally, the portable electronic leash 12 may include a GPS tracking chip linked to a dedicated app to locate the phone, should it become lost or stolen. It should be understood that the exemplary embodiment(s) may be used with a variety of phones, and should not be limited to any particular phone described herein.

The combined portable electronic leash and mobile phone case (collectively at "10") includes a mobile phone case 11 and a portable leash 12 configured to be clipped to a user garment and detachably connected to an existing mobile phone. Advantageously, the leash 12 includes a housing 13 including a centrally registered rotational axis 14, a spool 15 having a plurality of stationary spokes 16 fixedly attached thereto, a primary spring member 17 anchored to the spokes 16 and wound along a circumferential inner surface 15a of the spool 15, a central bracket 18 and a secondary spring 19 located therein, a flexible cable 20 having a proximal end 20a anchored to the central bracket 18 wherein the flexible cable 20 is wrapped about a circumferential outer surface 15*b* of the spool 15, a fastener 43 attached to a distal end 20*b* of the flexible cable 20 and detachably connected to the mobile phone case 11, and a mechanism 21 for transmitting an alert signal when the flexible cable 20 is extracted beyond a maximum threshold distance (e.g., when the fourth dynamic sensor 25*dd* near the proximal end 20*a* of the flexible cable 20) is discharged outwardly away from the housing 13. Advantageously, the alert signal transmitting mechanism 21 is coupled to the housing 13 and the flexible cable 20. Such a structural configuration provides the new, useful, and unpredicted result of facilitating efficient operation of the mobile phone, as well as "catching" the phone and preventing damage should the phone be accidentally dropped, as well as alerting a user when the phone is displaced (extracted) beyond a maximum threshold distance (e.g., beyond the fourth dynamic sensor 25*d* near the proximal end of the flexible cable 20) from the housing 13.

In a non-limiting exemplary embodiment, the alert signal transmitting mechanism 21 includes a controller 22, a transducer 23 communicatively coupled to the controller 22, a stationary sensor 24 statically affixed to an interior surface of the housing 13 (e.g., positioned adjacent to an exit port 59 where the flexible cable 20 exits the housing 13), and a plurality of dynamic sensors 25 statically affixed to an outer surface of the flexible cable 20 and along a longitudinal length of the flexible cable 20. A power source 72 supplies power to the controller 22 and other components as needed. Advantageously, the stationary sensor 24 generates and transmits an initiate (start) alert signal to the controller 22 when the flexible cable 20 is extracted beyond the maximum threshold distance (e.g., when the fourth dynamic sensor 25*d* near the proximal end 20*a* of the flexible cable 20 passes stationary sensor 24 located at the exit port 59 of the housing 13). Advantageously, the stationary sensor 24 generates and transmits a terminate (stop) alert signal to the controller 22 when the flexible cable 20 is retracted back into the housing 13 and disposed within the maximum threshold distance (e.g., when the fourth dynamic sensor 25*d* near the proximal end 20*a* of the flexible cable 20 is rewound back into the housing 13 about spool 15 and passes stationary sensor 24 located at the exit port 59 of the housing 13). Advantageously, the controller 22, upon receipt of the initiate alert signal and the terminate alert signal, respectively instructs the transducer 23 to initiate (start) and terminate (stop) emission of an alarm signal. The alarm signal may be haptic, visual, oral, etc. Such a structural configuration provides the new, useful, and unpredicted result of alerting a user when the phone is displaced beyond a maximum threshold distance (e.g., beyond the fourth dynamic sensor 25*d* near the proximal end of the flexible cable 20) from the housing 13.

In a non-limiting exemplary embodiment, the central bracket 18 includes a first slot 28 and a second slot 29 diametrically opposed therefrom such that the central bracket 18 is bifurcated into a first section 30 and a second section 31 spaced apart from the first section 30. In this manner, a shape of the first section 30 is a mirror image of a shape of the second section 31. Advantageously, as perhaps best shown in FIGS. 4 and 5, an end 17*a* of the primary spring member 17 passes through at least one of the first slot 28 and the second slot 29 and statically engages at least one of the first section 30 and the second section 31 (via welding, adhesive, etc.) so that the primary spring member 17 is respectively tensioned and released as the spool 15 is rotated in opposed rotational directions (clockwise and counter clockwise) while the flexible cable 20 is extracted and retracted relative to the housing 13, respectively. In other words, the primary spring member 17 is constricted as the flexible cable 20 and spool 15 rotate in sync during winding (retraction) and unwinding (extraction) displacement of the flexible cable 20 relative to the housing 13. Such a structural configuration provides the new, useful, and unpredicted result of facilitating efficient operation of the mobile phone, as well as "catching" the phone and preventing damage should the phone be accidentally dropped.

In a non-limiting exemplary embodiment, the alert signal transmitting mechanism 21 further includes a remotely located peripheral electronic device 35 (e.g., laptop, tablet, PC, etc.), and a transceiver 36 communicatively coupled to the controller 22 for transmitting the alarm signal to the remotely located peripheral electronic device 35. Such a structural configuration provides the new, useful, and unpredicted result of alerting a user when the phone is displaced beyond a maximum threshold distance (e.g., beyond the fourth dynamic sensor 25*d* near the proximal end 20*a* of the flexible cable 20) from the housing 13, as well as alerting the user of a location of the mobile phone via a graphical user interface on the peripheral electronic device 35, for example.

In a non-limiting exemplary embodiment, the housing 13 further includes a first half section 37 and a second half section 38 removably coupled thereto, and a plurality of brakes 39 disposed along and extended inwardly from the circumferential inner surface 15*a* of the spool 15. Such a structural configuration provides the new, useful, and unpredicted result of facilitating efficient operation of the mobile phone, as well as "catching" the phone and preventing damage should the phone be accidentally dropped.

In a non-limiting exemplary embodiment, the first half section 37 includes a central end cap 41 including a finger 42 directly abutted within the secondary spring 19 member and aligned along the centrally registered rotational axis 14. Advantageously, the central end cap 41 is displaced towards the central bracket 18 and engaged with the brakes 39 to oppose (or prevent) rotation of the spool 15. Such a structural configuration provides the new, useful, and unpredicted result of facilitating efficient operation of the mobile phone, as well as "catching" the phone and preventing damage should the phone be accidentally dropped.

In a non-limiting exemplary embodiment, the fastener 43 is one of a carabiner 43*a* and a suction cup 43*b*. Such a structural configuration provides the new, useful, and unpredicted result of facilitating alternate connections to various types of mobile phone cases 11.

The present disclosure further includes a method of utilizing a combined portable electronic leash and mobile phone case (collectively at "10") for preventing damage to an existing mobile phone if accidentally dropped by the user. Such a method includes the chronological steps of: providing an existing mobile phone; providing and attaching a mobile phone case 11 to said existing mobile phone; providing a mobile phone case 11; and providing a leash 12. The leash 12 includes a housing 13 including a centrally registered rotational axis 14, a spool 15 having a plurality of stationary spokes 16 fixedly attached thereto, a primary spring member 17 anchored to the spokes 16 and wound along a circumferential inner surface 15*a* of the spool 15, a central bracket 18 and a secondary spring 19 located therein, a flexible cable 20 having a proximal end 20*a* anchored to the central bracket 18 and wrapped about a circumferential outer surface 15*b* of the spool 15, a fastener 43 attached to a distal end 20*b* of the flexible cable 20 and detachably connected to the mobile phone case 11, and a mechanism 21 for transmitting an alert signal when the flexible cable 20 is extracted beyond a maximum threshold distance (e.g., beyond the fourth dynamic sensor 25*d* near the proximal end 20*a* of the flexible cable 20) outwardly away from the housing 13.

The method further includes the chronological steps of: coupling the alert signal transmitting mechanism 21 to the housing 13 and the flexible cable 20; clipping the portable leash 12 to the mobile phone case 11; detachably connecting the portable leash 12 to a user garment; and transmitting an alert signal when the flexible cable 20 is extracted beyond the maximum threshold distance (e.g., when the flexible cable 20 is extracted from the housing 13 beyond the fourth dynamic sensor 25*d* near the proximal end 20*a* of the flexible cable 20) outwardly away from the housing 13. Such a structural configuration provides the new, useful, and unpredicted result of facilitating efficient operation of the mobile phone, "catching" the phone and preventing damage should the phone be accidentally dropped, alerting a user when the phone is displaced beyond the maximum threshold distance (e.g., beyond the fourth dynamic sensor 25*d* near the proximal end 20*a* of the flexible cable 20) from housing 13, as well as alerting the user of a location of the mobile phone via a graphical user interface, for example.

Referring to FIGS. 1-8, in a non-limiting exemplary embodiment(s), the combined portable electronic leash and mobile phone case (collectively at "10") is envisioned as a retractable cell phone case 11 and leash 12 that is able to be affixed to the person with optimal security and accessibility. This universal product is essentially rectangular in shape, sized appropriately for any smartphone currently on the market. The leash 12 has a durable plastic housing 13 that boasts a spring-loaded coil of wire that could extend to a length of up to five feet (5'). As designed, the leash 12 is conveniently secured to one's belt, belt loops, backpack, or handbag via a provided, detachable clip fastener. Fashionable and eye-catching, the leash 12 is produced in a variety of colors to appeal to individual tastes or to match most styles of clothing.

Use of the combined portable electronic leash and mobile phone case (collectively at "10") very simple and straightforward. First, the user would select a unit based on personal preference of color. By way of example, a construction worker may want a basic brown or black unit that is simply serviceable. Conversely, a female executive may desire a plum-colored leash 12 to accentuate her newest business suit. The user would then clip the unit onto a belt loop or purse strap, and the mobile phone case 11 then be affixed to the leash 12. With the phone case 11 secured to the person in such a manner, the user need only reach for the phone should it ring or become necessary to place a call, to take picture or video, or to read text messages and webpages, just to name a few of the many operative possibilities inherent in cellular smartphones. The phone case 11 would stretch along the provided wire and, when the user has finished, would retract back to the safety of the housing 13. When desired, the housing 13 is easily removed from the person, and stored until needed again.

The combined portable electronic leash and mobile phone case (collectively at "10") offers consumers many significant benefits and advantages. Foremost, this cleverly designed device would provide a sturdy and simple means of securing a cellular smartphone to the person. Creatively appropriating a retractable tether device, the combined portable electronic leash and mobile phone case (collectively at "10") ensures that costly cellular equipment would not be broken or destroyed. Additionally, there would be no risk of the phone being lost or stolen, as users would have their devices with them at all times. Heavy-duty yet flexible, the universality of the combined portable electronic leash and mobile phone case (collectively at "10") accommodates any user, from petite young women to burly, heavyset truck drivers. As the phone would be within easy reach at all times, users would be able to receive and place calls, take instant video shots, and access messages in a matter of seconds. Eliminating the need for belts or similar anchors necessary for plastic clips, the combined portable electronic leash and mobile phone case (collectively at "10") can be used by anyone with a cellular smartphone, regardless of what they are wearing.

Any mobile phone case would work this universal product; particularly ideal for smartphones, as the name implies, the combined portable electronic leash and mobile phone case (collectively at "10") ensures that these extremely popular yet highly costly phones are easily carried, accessed, and protected. Not limited to just phones, this product could be augmented to accommodate other forms of mobile communication, such as tablet computers. Manufactured of durable, high quality materials and easily adaptable to new phone upgrades, the combined portable electronic leash and mobile phone case (collectively at "10") will provides years of continual use.

The combined portable electronic leash and mobile phone case (collectively at "10") is a practical product which would enable consumers to protect and access their phones at all times, whether at work or play. Ensuring that expensive cellular equipment is secure yet accessible, this innovative product would save users valuable time and, more importantly, high repair and replacement costs. Affordably priced, the combined portable electronic leash and mobile phone case (collectively at "10") would be well-received by the vast number of consumers who depend on cellular smartphones, an extremely sizable market potential.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is

What is claimed as new and what is desired to secure by Letters Patent of the United States is:

1. A combined portable electronic leash and mobile phone case for preventing damage to an existing mobile phone if accidentally dropped, said combined portable electronic leash and mobile phone case comprising:
   a mobile phone case configured to be attached to an existing mobile phone;
   a leash detachably connected to said mobile phone case, said leash comprises a housing including
      a centrally registered rotational axis,
      a spool having a plurality of spokes fixedly attached thereto,
      a primary spring member anchored to said spokes and wound along a circumferential inner surface of said spool,
      a central bracket and a secondary spring located therein,
      a flexible cable having a proximal end anchored to said central bracket and wrapped about a circumferential outer surface of said spool,
      a fastener attached to a distal end of said flexible cable and detachably connected to said mobile phone case, and
      a mechanism for transmitting an alert signal when said flexible cable is extracted beyond a maximum threshold distance outwardly away from said housing;
      wherein said alert signal transmitting mechanism is coupled to said housing and said flexible cable wherein said alert signal transmitting mechanism comprises: a controller; a transducer communicatively coupled to said controller; a stationary sensor statically affixed to an interior surface of said housing; and a plurality of dynamic sensors statically affixed to a longitudinal length of said flexible cable; wherein said stationary sensor generates and transmits an initiate alert signal to said controller when said flexible cable is extracted beyond said maximum threshold distance; wherein said stationary sensor generates and transmits a terminate alert signal to said controller when said flexible cable is retracted within said maximum threshold distance; wherein said controller, upon receipt of said initiate alert signal and said terminate alert signal, respectively instructs said transducer to initiate and terminate emission of an alarm signal.

2. The combined portable electronic leash and mobile phone case of claim 1, wherein said central bracket comprises: a first slot and a second slot diametrically opposed therefrom such that said central bracket is bifurcated into a first section and a second section spaced apart from said first section;
   wherein a shape of said first section is a mirror image of a shape of said second section;
   wherein said primary spring member passes through one of said first slot and said second slot and statically engages one of said first section and said second section so that said primary spring member is tensioned and released as said spool is rotated in opposed rotational directions while said flexible cable is extracted and retracted relative to said housing, respectively.

3. The combined portable electronic leash and mobile phone case of claim 2, wherein said alert signal transmitting mechanism further comprises:
   a remotely located peripheral electronic device; and
   a transceiver communicatively coupled to said controller for transmitting said alarm signal to said remotely located peripheral electronic device.

4. The combined portable electronic leash and mobile phone case of claim 3, wherein said housing further comprises:
   a first half section and a second half section removably coupled thereto; and
   a plurality of brakes disposed along and extended inwardly from said circumferential inner surface of said spool.

5. The combined portable electronic leash and mobile phone case of claim 4, wherein said first half section comprises: a central end cap including a finger directly abutted within said secondary spring member and aligned along the centrally registered rotational axis; said central end cap being displaced towards said central bracket and being engaged with said brakes.

6. The combined portable electronic leash and mobile phone case of claim 1, wherein said fastener is one of a carabiner and a suction cup.

7. A combined portable electronic leash and mobile phone case for preventing damage to an existing mobile phone if accidentally dropped, said combined portable electronic leash and mobile phone case comprising:
   a mobile phone case configured to be attached to an existing mobile phone;
   a portable leash configured to be clipped to a user garment and detachably connected to said mobile phone case, said leash comprises a housing including
      a centrally registered rotational axis,
      a spool having a plurality of spokes fixedly attached thereto,
      a primary spring member anchored to said spokes and wound along a circumferential inner surface of said spool,
      a central bracket and a secondary spring located therein,
      a flexible cable having a proximal end anchored to said central bracket and wrapped about a circumferential outer surface of said spool,
      a fastener attached to a distal end of said flexible cable and detachably connected to said mobile phone case, and
      a mechanism for transmitting an alert signal when said flexible cable is extracted beyond a maximum threshold distance outwardly away from said housing;
      wherein said alert signal transmitting mechanism is coupled to said housing and said flexible cable; wherein said alert signal transmitting mechanism comprises: a controller; a transducer communicatively coupled to said controller; a stationary sensor statically affixed to an interior surface of said housing; and a plurality of dynamic sensors statically affixed to a longitudinal length of said flexible cable; wherein said stationary sensor generates and transmits an initiate alert signal to said controller when said flexible cable is extracted beyond said maximum threshold distance; wherein said stationary sensor generates and transmits a terminate alert signal to said controller when said flexible cable is retracted within said maximum threshold distance;

wherein said controller, upon receipt of said initiate alert signal and said terminate alert signal, respectively instructs said transducer to initiate and terminate emission of an alarm signal.

8. The combined portable electronic leash and mobile phone case of claim 7, wherein said central bracket comprises: a first slot and a second slot diametrically opposed therefrom such that said central bracket is bifurcated into a first section and a second section spaced apart from said first section;

wherein a shape of said first section is a mirror image of a shape of said second section;

wherein said primary spring member passes through one of said first slot and said second slot and statically engages one of said first section and said second section so that said primary spring member is tensioned and released as said spool is rotated in opposed rotational directions while said flexible cable is extracted and retracted relative to said housing, respectively.

9. The combined portable electronic leash and mobile phone case of claim 8, wherein said alert signal transmitting mechanism further comprises:

a remotely located peripheral electronic device; and a transceiver communicatively coupled to said controller for transmitting said alarm signal to said remotely located peripheral electronic device.

10. The combined portable electronic leash and mobile phone case of claim 9, wherein said housing further comprises:

a first half section and a second half section removably coupled thereto; and a plurality of brakes disposed along and extended inwardly from said circumferential inner surface of said spool.

11. The combined portable electronic leash and mobile phone case of claim 10, wherein said first half section comprises: a central end cap including a finger directly abutted within said secondary spring member and aligned along the centrally registered rotational axis; said central end cap being displaced towards said central bracket and being engaged with said brakes.

12. The combined portable electronic leash and mobile phone case of claim 11, wherein said fastener is one of a carabiner and a suction cup.

13. A method of utilizing a combined portable electronic leash and mobile phone case for preventing damage to an existing mobile phone if accidentally dropped, said method comprising the steps of:

providing an existing mobile phone;

providing and attaching a mobile phone case to said existing mobile phone;

providing a leash comprising a housing including a centrally registered rotational axis, a spool having a plurality of spokes fixedly attached thereto, a primary spring member anchored to said spokes and wound along a circumferential inner surface of said spool, a central bracket and a secondary spring located therein, a flexible cable having a proximal end anchored to said central bracket and wrapped about a circumferential outer surface of said spool, a fastener attached to a distal end of said flexible cable and detachably connected to said mobile phone case, and a mechanism for transmitting an alert signal when said flexible cable is extracted beyond a maximum threshold distance outwardly away from said housing;

coupling said alert signal transmitting mechanism to said housing and said flexible cable;

clipping said portable leash to said mobile phone case;

detachably connecting said portable leash to a user garment; and transmitting an alert signal when said flexible cable is extracted beyond said maximum threshold distance outwardly away from said housing wherein said mechanism for transmitting an alert signal comprises: a controller; a transducer communicatively coupled to said controller; a stationary sensor statically affixed to an interior surface of said housing; and a plurality of dynamic sensors statically affixed to a longitudinal length of said flexible cable; wherein said stationary sensor generates and transmits an initiate alert signal to said controller when said flexible cable is extracted beyond said maximum threshold distance; wherein said stationary sensor generates and transmits a terminate alert signal to said controller when said flexible cable is retracted within said maximum threshold distance; wherein said controller, upon receipt of said initiate alert signal and said terminate alert signal, respectively instructs said transducer to initiate and terminate emission of an alarm signal.

\* \* \* \* \*